United States Patent Office 3,280,217
Patented Oct. 18, 1966

3,280,217
PRESSURE SENSITIVE ADHESIVE COMPRISING (1) ALKYL VINYL ETHER POLYMER (2) PHENOL-ALDEHYDE RESIN (3) A VINYL POLYMERIZED INTERPOLYMER
William Lader, Staten Island, N.Y., and Donald H. Zang, Bloomfield, N.J., assignors to Pittsburgh Plate Glass Company, Pittsburgh, Pa., a corporation of Pennsylvania
No Drawing. Filed May 21, 1963, Ser. No. 282,139
23 Claims. (Cl. 260—844)

This invention relates to adhesive compositions of uniquely improved properties, and more particularly to compositions having exceptional adhesive strength and pressure sensitivity over a wide temperature range.

While, a number of compositions have been proposed as pressure sensitive adhesives, and several such compositions have been widely utilized, such materials have all been subject to certain disadvantages. For example, under certain conditions, such as elevated temperatures, they may lose their pressure sensitivity and strength. Moreover, such compositions are subject to attack by various solvents and fluids which may be encountered when they are employed in certain applications.

This invention provides adhesive compositions having surprisingly unique and especially desirable properties not achieved by the compositions known heretofore. For example, the adhesive compositions described herein have good physical properties over a wide temperature range, retaining their holding ability at temperatures of 150° F. and higher. Furthermore, films and coatings made from these compositions resists boiling water as well as various paraffinic hydrocarbon fluids for prolonged periods. These properties are achieved along with exceptional adhesive strength under tensile or peel load when used to bond any of a wide variety of surfaces.

The new adhesive compositions of this invention are made up of certain proportions of several essential components, to which there may be added other optional materials. The essential components include:

(1) Above 100 parts of a solid, normally tacky poymer of an alkyl vinyl ether,
(2) From about 20 to about 200 parts of an oil-soluble, heat-hardenable phenol-aldehyde resin, and
(3) From about 30 to about 300 parts of a normally tacky interpolymer. The monomers used in making the interpolymer should comprise (a) at least about 25 mole percent based on the interpolymer, of at least one alkyl acrylate, and (b) about 1 to about 10 mole percent of at least one copolymerizable ethylenically unsaturated monomer having a polar functional group capable of undergoing a cross-linking reaction. Except where otherwise specified, the parts and percentages given are by weight and are based upon the nonvolatile resin solids content of the components, as are all parts and percentages set forth herein.

The alkyl acrylate of the interpolymer, described as (a) above, should have at least about 4 carbon atoms in the alkyl group and may have up to about 15 carbon atoms or more in this group. The cross-linkable functional group in the comonomer, described as (b) above, can be any of those groups which are known in the art to undergo cross-linking reactions. The conditions used to produce the interpolymer are those conventionally employed in vinyl polymerizations; thus, the interpolymerization takes place through the unsaturated linkages. Among the comonomers which can be included in the interpolymer to provide the cross-linking sites are those containing such functional groups as hydroxyl, carbonyl, amino, amido, N-hydroxyalkylamido, N-alkoxyalkylamido, epoxy and nitrilo functional groups.

In addition to these monomers, the interpolymer may include essentially an ethylenically unsaturated monomers, preferably having a single $CH_2=C<$ group, provided the interpolymer has some tack at normal or ambient conditions.

As indicated above, various optional ingredients may be added to the adhesive composition in addition to those essential components specified. These include tackifiers, plasticizers, fillers and the like. It is particularly desirable in many instances to include an added tackifying resin in the composition; when this is done, generally above 30 to about 300 parts of the added tackifying resin are employed. The desirable properties of the compositions described herein are attained even when substantial quantities of the added tackifying resin are present.

A basic component of the adhesive composition is a polymer of an alkyl vinyl ether. Any of the alkyl vinyl ether polymers which are solid and normally tacky can be employed, including alkyl vinyl ether homopolymers, as well as copolymers of one or more such ethers along with minor amounts of other polymerizable monomers. Among the alkyl vinyl ether monomers which can be utilized in making polymers for use herein are methyl vinyl ether, ethyl vinyl ether, isopropyl vinyl ether, n-butyl vinyl ether, isobutyl vinyl ether, 2-ethylhexyl vinyl ether, n-amyl vinyl ether, n-hexyl vinyl ether, n-decyl vinyl ether and n-octadecyl vinyl ether. The molecular weight of the alkyl vinyl ether polymer can be varied widely so long as the polymer is a tacky solid under normal conditions.

The phenolic resin component of the adhesive composition can be any oil-soluble, heat-hardenable condensation product of a phenol and an aldehyde. The particular reactants, reactant ratios, catalysts and polymerization conditions that can be used to achieve phenol-aldehyde resins having these properties are well known in the art.

Ordinarily, the phenol employed is substituted in the para-position. For example, phenols used to make such resins include para-phenyl phenol, para-tertiary amyl phenol, para-cyclohexyl phenol, para-octyl phenol and para-tertiary butyl phenol. Such resins may also contain minor proportions of phenol or bisphenol. Resins produced from para-tertiary butyl phenol are usually preferred. In most instances, the aldehyde condensed with the phenol is formaldehyde, although other aldehydes, such as acetaldehyde, can be employed if desired. Methylene-releasing and aldehyde-releasing agents, such as paraformaldehyde and hexamethylene tetramine, may also be utilized as the aldehyde reagent. The ratio of aldehyde to phenol is usually in excess of 1:1, typically between about 1.5 and 2.0 moles of aldehyde per mole of phenol. Oil-soluble, heat-hardenable phenolic resins are generally produced using alkaline catalysts.

The interpolymer as described above is a normally tacky resin in which at least about 25 mole percent of an alkyl acrylate having 4 to 15 carbon atoms in the alkyl group is interpolymerized with about 1 to about 10 mole percent of an ethylenically unsaturated monomer having a polar functional group capable of taking part in a cross-linking reaction, and, if desired, with one or more other vinyl polymerizable monomers.

Among the alkyl acrylates used are butyl acrylate, amyl acrylate, hexyl acrylate, heptyl acrylate, 2-ethyl hexyl acrylate, decyl acrylate and lauryl acrylate. The types of functional groups which take part in cross-linking reactions are well known and any ethylenically unsaturated monomer containing such a group can be interpolymerized with the alkyl acrylate and any other monomers to produce the interpolymer component herein. Those functional groups contained in the monomers most often employed in producing the interpolymers for these adhesives include hydroxyl, carboxyl, amino, amido, N-hydroxyalkylamido, epoxy and nitrilo groups.

Among the various hydroxyl-containing monomers which are employed are hydroxyalkyl esters of alpha, beta-ethylenically unsaturated carboxylic acids. These include such monomers at beta-hydroxyethyl acrylate and methacrylate, beta-hydroxypropyl acrylate and methacrylate, 2,3-dihydroxypropyl acrylate and methacrylate, 6,10-dihydroxydecyl acrylate and methacrylate, and similar alkylene glycol monoesters of unsaturated acids, including the corresponding esters of unsaturated dicarboxylic acids, such as maleic acid. Unsaturated aliphatic alcohols are other examples of hydroxyl-containing monomers; for instance, allyl alcohol, methallyl alcohol, allyl carbinol, beta-allyl ethyl alcohol, vinyl ethyl carbinol, and the like. There may also be employed other hydroxyl-containing monomers, such as beta-hydroxyethyl vinyl ether and similar compounds in which both the hydroxyl group and the polymerizable ethylenic group are present.

The carboxyl-containing monomers which are utilized include the various ethylenically unsaturated carboxylic acids. The preferred acids are acrylic acid and methacrylic acid, although there may also be employed other unsaturated monocarboxylic acids, such as crotonic acid, as well as unsaturated dicarboxylic acids, such as maleic acid, fumaric acid and itaconic acid. It is usually desirable that the unsaturated carboxylic acid have not more than about 6 carbon atoms attached to the carboxyl group through carbon to carbon linkages.

Amino-containing monomers are exemplified by the various aminoalkyl esters of unsaturated carboxylic acids, such as esters of acrylic acid, methacrylic acid, ethacrylic acid and the like. Some examples of these esters are N,N-dimethylaminoethyl acrylate, N-tertiary-butylaminoethyl acrylate, N-tertiary-butylaminobutyl acrylate, N-tertiary-octylaminoethyl methacrylate, N,N-dimethylaminoethyl methacrylate, bis(N,N-dimethylaminoethyl)maleate and similar compounds. Other monomers containing an amino group as well as a polymerizable ethylenically unsaturated linkage, any of which may be employed, include such compounds as aminoethyl vinyl ether and aminoethyl vinyl sulfide.

The preferred amido-containing monomers employed in making the interpolymer component are the unsaturated carboxylic acid amides, such as acrylamide, methacrylamide, itaconic diamide and the like, although other materials such as N-carbamyl maleimide and similar imide derivatives can be used, as can other monomers containing an amido group in an ethylenically unsaturated molecule.

Substituted amido compounds are also desirable. These include alkylolated amides in which the amido group is reacted with an aldehyde, for example, N-methylol derivatives of the foregoing unsaturated carboxylic acid amides. N-methylol acrylamide and N-methylol methacrylamide are the most often used monomers of this type. Similarly, there may be employed aldehyde-modified and etherified derivatives of the foregoing amides, and these are in some instances particularly desirable. These amide derivatives contain an N-alkoxyalkylamido group and are exemplified by such compounds as N-methoxymethyl acrylamide, N-ethoxymethyl acrylamide, N-butoxymethyl acrylamide and N-butoxymethyl methacrylamide.

Another functional group which provides cross-linking properties when incorporated into the interpolymer is the epoxy group, which has the structure

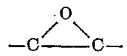

Typical monomers containing this group are glycidyl acrylate, glycidyl methacrylate and similar glycidyl derivatives of various ethylenically unsaturated acids. Other unsaturated compounds containing an epoxy group, such as allyl glycidyl ether, can also be used.

A monomer containing a nitrilo group, that is, an ethylenically unsaturated compound also containing a triple bonded carbon to nitrogen group, can also be used to provide the cross-linking site in the interpolymer. Suitable compounds for this purpose are, for example, acrylonitrile, methacrylonitrile and ethacrylonitrile.

Several monomers having differing interreactive functional groups of the class described can be included in the interpolymer if desired. The use of such a mixture of monomers can provide better cross-linking without the use of any added agent.

The interpolymer may be made up entirely of the cross-linking monomer and the alkyl acrylate as described above. As indicated, however, there may also be included, if desired, other copolymerizable monomers provided the acrylate and the cross-linking monomer are present in the proportions specified. It is preferred that any other monomers utilized contain a polymerizable ethylenically unsaturated group in terminal position, and any such monomer can be utilized. These include, for example, monoolefinic hydrocarbons, such as styrene and vinyl toluene; halogenated monoolefinic hydrocarbons, such as vinyl chloride and vinylidene chloride; esters, such as vinyl acetate, ethyl methacrylate, ethyl acrylate, octadecyl acrylate, isopropenyl acetate and dimethyl maleate; and dienes, such as butadiene-1,3.

Some examples of interpolymers suitable for the herein-described adhesive compositions are as follows:

| Interpolymer A: | Mole percent |
|---|---|
| 2-ethylhexyl acrylate | 64 |
| Mehacrylic acid | 3 |
| Glycidyl methacrylate | 3 |
| Ethyl acrylate | 30 |
| Interpolymer B: | |
| Ethyl acrylate | 52 |
| 2-ethylhexyl acrylate | 42 |
| Methacrylic acid | 3 |
| Acrylamide | 3 |
| Interpolymer C: | |
| Butyl acrylate | 57 |
| Ethyl acrylate | 40 |
| Beta-aminoethyl vinyl ether | 3 |
| Interpolymer D: | |
| 2-ethylhexyl acrylate | 66 |
| Vinvyl acetate | 32 |
| N-butoxymethyl acrylamide | 2 |
| Interpolymer E: | |
| 2-ethylhexyl acrylate | 66 |
| Vinvyl acetate | 32 |
| N-hydroxymethyl acrylamide | 2 |
| Interpolymer F: | |
| 2-ethylhexyl acrylate | 60 |
| Ethyl acrylate | 30 |
| Beta-hydroxyethyl acrylate | 10 |
| Interpolymer G: | |
| Styrene | 35 |
| Ethyl acrylate | 30 |
| Butyl acrylate | 30 |
| Glycidyl methacrylate | 5 |
| Interpolymer H: | |
| 2-ethylhexyl acrylate | 71 |
| Vinyl acetate | 20 |
| Acrylonitrile | 9 |
| Interpolymer I: | |
| Vinyl acetate | 30 |
| Isooctyl acrylate | 65 |
| Acrylic acid | 5 |
| Interpolymer J: | |
| 2-ethylhexyl acrylate | 95 |
| Acrylamide | 5 |

The interpolymers as described above are produced using the conventional techniques employed in making acrylate polymers. The reaction is ordinarily carried out by refluxing the monomers in solution, using solvents such as xylene and n-butanol. A free radical catalyst is generally utilized, typically a peroxide, such as benzoyl peroxide or cumene hydroperoxide, or an azo compound, such as p-methoxyphenyl diazothio-(2-naphthyl ether) or azo-bis-isobutyronitrile. Azo catalysts are especially desirable when an amino-containing monomer is employed.

Suitable adhesive compositions as described herein are obtained by blending the polymer of an alkyl vinyl ether, the phenolic resin and the interpolymer component in the proportions set forth. However, it is desirable to include an added tackifying resin in the composition. The preferred tackifying resins are pressure-sensitive polymers of alkyl acrylates, such as polymers of butyl acrylate, hexyl acrylate and 2-ethylhexyl acrylate, and polymers of similar alkyl acrylates. In addition to homopolymers of such esters, copolymers of acrylates with monomers as vinyl acetate are also desirable tackifying resins.

While acrylate polymers are the most desirable, other added tackifying resins that can be used include rosin and rosin derivatives, such as the glycerol ester of hydrogenated rosin (Staybelite Ester-10), the methyl ester of hydrogenated rosin, and the like; polyterpenes, such as polymized beta-pinene (e.g., Piccolyte S-115, which has a softening point of 115° C.); hydrocarbon resins, such as polycyclopentadiene and polymerized petroleum fractions (e.g., Piccopale 100, which is a polymer of aliphatic and alicyclic hydrocarbons having a softening point of 100° C.); chlorinated biphenyl resins, such as chlorinated polyphenyl and chlorinated biphenyl; terpene-phenolic resins, such as the reaction product of rosin and phenol having a melting point of 270° F. and an acid number of about 65 (SP-560 Resin); coumarone-indene resins, such as the resinous product of polymerized coal tar light oils (e.g., Nevillac Hard, which has a softening point of 70° C. to 80° C.); and polystyrenes, such as polymerized alpha-methyl styrene. When a tackifying resin is employed in the composition, it is generally present in an amount between about 30 and about 300 parts by weight.

Other optional materials which may be added include materials which promote the cross-linking action of the functional group or groups of the interpolymer component. Epoxy resins, organic acid catalysts, carboxylic acids and anhydrides, polyisocyanates, polyamines, polyols, thermosetting phenolic resins, urea-formaldehyde resins, melamine-aldehyde resins and others can be employed for this purpose. The choice of the promoter, if one is desired, depends upon the nature of the functional group and is governed by the interreactivity of the groups involved.

The adhesive compositions of this invention are prepared from the foregoing components by blending the ingredients in a suitable solvent. Aromatic hydrocarbons, such as toluene and xylene, are the preferred solvents, but other solvents may be included, for example, esters, ketones, aliphatic hydrocarbons and the like. Although the components are simply blended to form the adhesive composition, the adhesive properties of the composition are surprisingly superior to those which would be expected from such a mixture. The unique properties exhibited by these adhesives may be due to some synergistic interaction or reaction between the components, although the nature of the mutual behavior of the materials is not fully understood.

Set forth below are several examples of the adhesive compositions described herein. These examples are illustrative only, and relate to the best embodiments of the invention as presently contemplated. Thus, they are not to be construed as limiting the invention. In the examples, the preferred alkyl vinyl ether polymer is employed, this polymer being polyvinyl ethyl ether having a reduced viscosity at 20° C. of 5.0 and a plasticity of 2.0 to 2.4 millimeters. It is known as Bakelite EDBN. The phenol-aldehyde resin utilized is the oil-soluble, heat-hardenable condensation product from the alkaline-catalyzed reaction of p-tertiary butyl phenol and excess formaldehyde (e.g., Bakelite CKR-1634 and equivalents). The compositions were produced in each instance by blending the components specified along with sufficient toluene to make the total nonvolatile solids content about 30 percent. The mixtures were blended with high speed agitation for about 8 hours at room temperature.

EXAMPLE 1

| | Parts by weight (solids) |
|---|---|
| Polyvinyl ethyl ether | 100.0 |
| Interpolymer A (as 35 percent solution in acetone) | 164.0 |
| Phenol-aldehyde resin | 150.0 |
| Poly(butyl acrylate) (as 30 percent solution in ethyl acetate) | 98.8 |

EXAMPLE 2

| | |
|---|---|
| Polyvinyl ethyl ether | 100.0 |
| Interpolymer B (as 45 percent solution in an 80/20 mixture of acetate and hexane) | 205.0 |
| Phenol-aldehyde resin | 150.0 |
| Poly(butyl acrylate) (as 30 percent solution in ethyl acetate) | 100.0 |
| Hydroabietyl alcohol (Abitol) | 56.0 |

EXAMPLE 3

| | |
|---|---|
| Polyvinyl ethyl ether | 100.0 |
| Interpolymer A (as 30 percent solution in acetone) | 164.0 |
| Phenol-aldehyde resin | 150.0 |
| Poly(2-ethylhexyl acrylate) (as 30 percent solution in acetone) | 100.0 |

EXAMPLE 4

| | |
|---|---|
| Polyvinyl ethyl ether | 100.0 |
| Interpolymer A (as 30 percent solution in acetone) | 164.0 |
| Phenol-aldehyde resin | 74.0 |
| Poly(butyl acrylate) (as 30 percent solution in ethyl acetate) | 98.8 |
| Phenol-aldehyde resin (thermosetting, one-step phenol/cresol-formaldehyde resin, known as Durez 175) | 74.0 |

EXAMPLE 5

| | |
|---|---|
| Polyvinyl ethyl ether | 100.0 |
| Interpolymer B (as 45 percent solution in an 80/20 mixture of ethyl acetate and hexane) | 205.0 |
| Phenol-aldehyde resin | 150.0 |
| Poly(butyl acrylate) (as 30 percent solution in ethyl acetate) | 99.0 |
| Chlorinated biphenyl (melting point 31° C., 60 percent chlorine, known as Arochlor 1260) | 28.0 |

To demonstrate the advantageous properties of the adhesives exemplified above, they were subjected to an adhesion test in which a 2 mil film of the adhesive composition was applied to rigid polyvinyl chloride substrate 8.5 mils thick. After aging for 24 hours, a 1 inch strip of the adhesive-coated substrate was bonded to a clean, dry stainless steel panel using four strokes with a 4½-pound roller at about 12 inches per minute. The bonded assembly was allowed to remain at room temperature for 1 hours and then the load necessary to peel the strip from the panel at a rate of 12 inches per minute and at a 180° angle was determined. The results are set forth in Table I, along with the similar result attained using a conventional pressure-sensitive natural rubber-esterified rosin adhesive widely used in masking tapes.

*Table I*

| Adhesive: | Pounds/inch width |
|---|---|
| Conventional | 3 |
| Example 1 | 10.5 |
| Example 2 | 12 |
| Example 3 | 12 |
| Example 4 | 8 |
| Example 5 | 9 |

The manner in which these adhesives effectively bond a wide variety of surfaces was shown in a series of tests using the above procedure with several panels of varying types. These results, utilizing the adhesive composition of Example 1 above, are given in Table II.

*Table II*

| Panel: | Pounds/inch width |
|---|---|
| Polyvinyl chloride | 5 |
| Rubber | 8 |
| Vinyl floor tile | 9 |
| Copper | 10 |
| Aluminum | 10 |
| Pine wood | 8 |
| Redwood | 7 |

Another outstanding property of the compositions herein is their resistance to various fluids. This was demonstrated by tests such as one in which a polyvinyl chloride strip was coated with the composition of Example 1 and then bonded to a glass panel, in the manner described above. The laminated assembly was allowed to remain at room temperature for 1 hour and then immersed in boiling water. After 1 hour in the boiling water, the adhesive-coated strip was 95 percent unaffected. Another such vinyl-glass laminate withstood immersion in mineral oil (Esso Faxam 40) at 130° F. for over 21 days.

Similar results are attained by employing various interpolymers containing the functional groups of the class described. For example, suitable adhesive compositions are produced from Interpolymers C to J above using the formulations shown in Table III.

*Table III*

EXAMPLES 6–13

| | Example 6 | Example 7 | Example 8 | Example 9 | Example 10 | Example 11 | Example 12 | Example 13 |
|---|---|---|---|---|---|---|---|---|
| Interpolymer | C | D | E | F | G | H | I | J |
| Polyvinyl ethyl ether [1] (parts) | 100 | 100 | 100 | 100 | 100 | 100 | 100 | 100 |
| Phenol-aldehyde resin [1] (parts) | 100 | 100 | 150 | 150 | 80 | 120 | 150 | 100 |
| Interpolymer (parts) | 100 | 250 | 300 | 150 | 80 | 200 | 250 | 200 |
| Poly(butyl acrylate) [1] (parts) | 160 | | | 100 | 100 | 50 | 50 | |
| Thermosetting phenol-aldehyde resin (parts) | | | | | | 10.0 | | 5.0 |
| Epoxy resin [2] (parts) | 2 | | | | | | 3 | 3 |
| Ethyl acid phosphate (parts) | 0.4 | 1.25 | 1.5 | | | | | |
| Fumaric acid (parts) | | | | 5.0 | | | | |
| Phthalic anhydride (parts) | | | | | 3.0 | | | |
| Triethylamine (parts) | | | | | 0.1 | | | |

[1] As in Example 1.
[2] 3,4-epoxy-6-methylcyclohexylmethyl-3,4-epoxy-6-methylcyclohexanecarboxylate (Epoxide 201).

There may also be substituted in the above formulations other phenol-aldehyde resins, such as the oil-soluble, heat-hardenable product of the alkaline-catalyzed condensation of para-phenyl phenol and formaldehyde, or the similar product of formaldehyde with 90 parts of p-tertiary butyl phenol and 10 parts of phenol.

Also, other tackifying resins can be used in place of all or part of the poly(alkyl acrylates) of the examples. These include the several resinous materials described above.

The compositions of this invention may be used in any of several ways. They are advantageously employed as a film adhesive wherein a dried film of the adhesive composition is used as an unsupported pressure-sensitive film. The film is handled by interleaving the adhesive between layers of release paper. When used, the film is removed from the release paper and applied between the surfaces to be bonded. The properties of the compositions described herein make them particularly adapted for use in this manner. Exemplifying the manner in which such a film adhesive is produced, the composition of Example 1 was reverse roller coated onto a release paper coated with a cured silicone resin. The wet film thickness was about 14 mils. The film on the release paper was dried for 35 minutes at 150° F., followed by 5 minutes at 275° F., and then wound into a roll. The resulting film had a dry weight of 40 to 45 pounds per ream and was easily removed from the release paper and used to bond various materials.

These adhesives can also be used as a liquid adhesive by applying an organic solvent solution of the composition onto a substrate, as by brushing, rolling or the like, and then drying. The adhesive-coated substrate is bonded to another surface in the usual manner.

In addition to the above-described embodiments of the invention, equivalent adhesive compositions may be produced by varying techniques. For example, the cross-linking monomer of the interpolymer component may contain more than one of the specified groups. Similarly, the proportion of the cross-linking monomer in the total interpolymer component present should be 1 to 10 percent, but equivalent compositions can be produced by incorporating several interpolymers containing higher or lower proportions in amounts so as to make the over-all proportion within the specified range. Provided the properties set forth are achieved and the components are as described, such embodiments are considered within the scope of the invention herein.

According to the provisions of the patent statutes, there are described above the invention and what are now considered to be its best embodiments. However, within the scope of the appended claims, it is to be understood that the invention can be practiced otherwise than as specifically described.

We claim:
1. An adhesive composition consisting essentially of:
   (1) 100 parts of a solid, normally tacky polymer of an alkyl vinyl ether,
   (2) from about 20 to about 200 parts of an oil-soluble, heat-hardenable phenol-aldehyde resin, and
   (3) from about 30 to about 300 parts of a normally tacky vinyl polymerized interpolymer of monomers comprising (a) at least about 25 mole percent based on the interpolymer of at least one alkyl acrylate having from about 4 to about 15 carbon atoms in the alkyl group, and (b) about 1 to about 10 mole percent of at least one polymerizable ethylenically unsaturated monomer having a functional group selected from the class consisting of hydroxyl, carboxyl, amino, amido, N-hydroxyalkylamido, N-alkoxyalkylamido, epoxy and nitrilo.

2. The composition of claim 1 containing from about 30 to about 300 parts of an added tackifying resin.

3. The composition of claim 2 in which said added tackifying resin is a pressure-sensitive polymer of an alkyl acrylate.

4. An adhesive composition consisting essentially of:
   (1) 100 parts of a solid, normally tacky polymer of an alkyl vinyl ether,
   (2) from about 20 to about 200 parts of an oil-soluble, heat-hardenable alkaline-catalyzed condensation product of a para-substituted phenol and excess formaldehyde, and
   (3) from about 30 to about 300 parts of a normally tacky vinyl polymerized interpolymer of monomers comprising (a) at least about 25 mole percent based on the interpolymer of at least one alkyl acrylate having from about 4 to about 15 carbon atoms in the alkyl group, and (b) about 1 to about 10 mole percent of at least one polymerizable ethylenically unsaturated monomer having a functional group selected from the class consisting of hydroxyl, carboxyl, amino, amido, N-hydroxyalkylamido, N-alkoxyalkylamido, epoxy and nitrilo.

5. An adhesive composition comprising:
(1) 100 parts of a solid, normally tacky polymer of an alkyl vinyl ether,
(2) from about 20 to about 200 parts of an oil-soluble, heat-hardenable phenol-aldehyde resin, and
(3) from about 30 to about 300 parts of a normally tacky vinyl polymerized interpolymer of monomers comprising (a) at least about 25 mole percent based on the interpolymer of at least one alkyl acrylate having from about 4 to about 15 carbon atoms in the alkyl group, and (b) from about 1 to about 10 mole percent of at least one hydroxyl-containing polymerizable ethylenically unsaturated monomer.

6. An adhesive composition comprising:
(1) 100 parts of a solid, normally tacky polymer of an alkyl vinyl ether,
(2) from about 20 to about 200 parts of an oil-soluble, heat-hardenable phenol-aldehyde resin, and
(3) from about 30 to about 300 parts of a normally tacky vinyl polymerized interpolymer of monomers comprising (a) at least about 25 mole percent based on the interpolymer of at least one alkyl acrylate having from about 4 to about 15 carbon atoms in the alkyl group, and (b) from about 1 to about 10 mole percent of at least one carboxyl-containing polymerizable ethylenically unsaturated monomer.

7. An adhesive composition comprising:
(1) 100 parts of a solid, normally tacky polymer of an alkyl vinyl ether,
(2) from about 20 to about 200 parts of an oil-soluble, heat-hardenable phenol-aldehyde resin, and
(3) from about 30 to about 300 parts of a normally tacky vinyl polymerized interpolymer of monomers comprising (a) at least about 25 mole percent based on the interpolymer of at least one alkyl acrylate having from about 4 to about 15 carbon atoms in the alkyl group, and (b) from about 1 to about 10 mole percent of at least one amino-containing polymerizable ethylenically unsaturated monomer.

8. An adhesive composition comprising:
(1) 100 parts of a solid, normally tacky polymer of an alkyl vinyl ether,
(2) from about 20 to about 200 parts of an oil-soluble, heat-hardenable phenol-aldehyde resin, and
(3) from about 30 to about 300 parts of a normally tacky vinyl polymerized interpolymer of monomers comprising (a) at least about 25 mole percent based on the interpolymer of at least one alkyl acrylate having from about 4 to about 15 carbon atoms in the alkyl group, and (b) from about 1 to about 10 mole percent of at least one amido-containing polymerizable ethylenically unsaturated monomer.

9. An adhesive composition comprising:
(1) 100 parts of a solid, normally tacky polymer of an alkyl vinyl ether,
(2) from about 20 to about 200 parts of an oil-soluble, heat-hardenable phenol-aldehyde resin, and
(3) from about 30 to about 300 parts of a normally tacky vinyl polymerized interpolymer of monomers comprising (a) at least about 25 mole percent based on the interpolymer of at least one alkyl acrylate having from about 4 to about 15 carbon atoms in the alkyl group and (b) from about 1 to about 10 mole percent of at least one N-hydroxyalkylamido-containing polymerizable ethylenically unsaturated monomer.

10. An adhesive composition comprising:
(1) 100 parts of a solid, normally tacky polymer of an alkyl vinyl ether,
(2) from about 20 to about 200 pars of an oil-soluble, heat-hardenable phenol-aldehyde resin, and
(3) from about 30 to about 300 parts of a normally tacky vinyl polymerized interpolymer of monomers comprising (a) at least about 25 mole percent based on the interpolymer of at least one alkyl acrylate having from about 4 to about 15 carbon atoms in the alkyl group, and (b) from about 1 to about 10 mole percent of at least one N-alkoxyalkylamido-containing polymerizable ethylenical unsaturated monomer.

11. An adhesive composition comprising:
(1) 100 parts of a solid, normally tacky polymer of an alkyl vinyl ether,
(2) from about 20 to about 200 parts of an oil-soluble, heat-hardenable phenol-aldehyde resin, and
(3) from about 30 to about 300 parts of a normally tacky vinyl polymerized interpolymer of monomers comprising (a) at least about 25 mole percent based on the interpolymer of at least one alkyl acrylate having from about 4 to about 15 carbon atoms in the alkyl group, and (b) from about 1 to about 10 mole percent of at least one epoxy-containing polymerizable ethylenically unsaturated monomer.

12. An adhesive composition consisting essentially of:
(1) 100 parts of a solid, normally tacky polymer of of an alkyl vinyl ether,
(2) from about 20 to about 200 parts of an oil-soluble, heat-hardenable phenol-aldehyde resin, and
(3) from about 30 to about 300 parts of a normally tacky vinyl polymerized interpolymer of monomers comprising (a) at least about 25 mole percent based on the interpolymer of at least one alkyl acrylate having from about 4 to about 15 carbon atoms in the alkyl group, and (b) from about 1 to about 10 mole percent of at least one nitrilo-containing polymerizable ethylenically unsaturated monomer.

13. The composition of claim 4 containing from about 30 to about 300 parts of an added tackifying resin.

14. The composition of claim 13 in which said added tackifying resin is a pressure-sensitive polymer of an alkyl acrylate.

15. A liquid adhesive composition comprising an organic solvent solution of the adhesive composition of claim 1.

16. A liquid adhesive composition comprising an organic solvent solution of the adhesive composition of claim 2.

17. A liquid adhesive composition comprising an organic solvent solution of the adhesive composition of claim 4.

18. An unsupported pressure-sensitive film adhesive consisting essentially of a dried film of an adhesive composition comprising:
(1) 100 parts of a solid, normally tacky polymer of an alkyl vinyl ether,
(2) from about 20 to about 200 parts of an oil-soluble, heat-hardenable phenol-aldehyde resin, and
(3) from about 30 to about 300 parts of a normally tacky vinyl polymerized interpolymer of monomers comprising (a) at least about 25 mole percent based on the interpolymer of at least one alkyl acrylate having from about 4 to about 15 carbon atoms in the alkyl group, and (b) about 1 to about 10 mole percent of at least one polymerizable ethylenically unsaturated monomer having a functional group selected from the class consisting of hydroxyl, carboxyl, amino, amido, N-hydroxyalkylamido, N-alkoxyalkylamido, epoxy and nitrilo.

19. The unsupported pressure-sensitive film adhesive of claim 18 in which the adhesive composition includes from about 30 to about 300 parts of an added tackifying resin.

20. The film adhesive of claim 19 in which said added tackifying resin is a pressure-sensitive polymer of an alkyl acrylate.

21. A pressure-sensitive adhesive coated article comprising a substrate and adherently bonded thereto a pressure-sensitive adhesive consisting essentially of a dried layer of the composition of claim 1.

22. A pressure-sensitive adhesive coated article comprising a substrate and adherently bonded thereto a pressure-sensitive adhesive consisting essentially of a dried layer of the composition of claim 2.

23. A pressure-sensitive adhesive coated article comprising a substrate and adherently bonded thereto a pressure-sensitive adhesive consisting essentially of a dried layer of the composition of claim 4.

References Cited by the Examiner

UNITED STATES PATENTS

| | | | |
|---|---|---|---|
| 2,787,603 | 4/1957 | Sanders | 260—844 |
| 2,937,956 | 5/1960 | Fendius et al. | 260—844 |
| 3,040,781 | 6/1962 | Reymann et al. | 260—844 |
| 3,173,889 | 3/1965 | Sylvester et al. | 260—844 |

FOREIGN PATENTS 722,805   2/1955   Great Britain.

MURRAY TILLMAN, *Primary Examiner.*

J. C. BLEUTGE, *Assistant Examiner.*